United States Patent Office 3,228,671
Patented Jan. 11, 1966

3,228,671
GAS CUTTING SYSTEM
Raymond G. Lyons, Iselin, N.J., assignor to Air Reduction Company, Incorporated, New York, N.Y., a corporation of New York
Filed June 19, 1962, Ser. No. 203,620
14 Claims. (Cl. 266—23)

This invention relates to a gas cutting system, and more particularly to the control of a cutting jet, such as an oxygen jet, and of the preheating flame in such a system. An object of the invention is the provision of improved arrangments for such control, including arrangements by which those functions are brought into play in automatically established proper relationships to each other. In one aspect, the invention provides such control under the command of a suitable record.

In a more particular aspect, the invention contemplates a system wherein the cutting torch is arranged for movements along two coordinate axes and wherein it may be caused to execute a desired travel—for example, to travel along a predetermined contour to be cut—by some form of control of its respective movements along those two axes. In this aspect, the invention particularly contemplates a system wherein those respective movements are placed under control of a record, and it provides for the placement of the cutting jet and the preheating flame under the control of that torch-movement-controlling record.

In the normal use of an oxygen cutting system, a preheating flame from the torch onto the work is brought into play to heat the work to such a degree that the subsequent introduction of a jet discharge from the torch onto the work may initiate an intense chemical reaction which will pierce the work and which, if the jet discharge be moved along the work by appropriate movement of the torch, will cut the work along the line of movement. The jet discharge after its initiation itself exerts a strong heating effect on the work, but that effect is usually not fully sufficient to render the chemical reaction self-sustaining and it is, therefore, customary to use the preheating flame after as well as before the beginning of cutting. It is not, however, necessary, nor is it economical, to continue the preheating flame at the high intensity required for pre-cut pre-heating. The invention provides for a preheating flame alternatively of low and high intensity, with means operated as an incident of the initiation of the jet discharge of oxygen for shifting that flame from high to low intensity.

While before the jet discharge is initiated the preheating flame should function at high intensity, nevertheless that intensity at the time of initial ignition may result in the phenomenon of "blow-away," wherein the flame becomes ignited at a distance from the torch and refuses to regress to its proper position. The invention provides for the ignition of the flame at low intensity followed by automatic shift to high intensity for the required pre-cut preheating.

At the time the jet discharge of oxygen is initiated, the work must have been so highly preheated that it is locally molten, and as a result of that condition an abrupt inception of the jet discharge may result in serious transient splattering of the molten work material with danger to nearby personnel, grave risk of clogging of orifices in the torch, and the like. The invention provides for the gradual onset of the jet discharge thereby avoiding such transient splattering and, in a preferred form, for that gradual onset to occur (or at least be completed) while the torch is moving.

The effectiveness of the arrangements for gradual onset of the jet discharge may be impaired if by the closure of a valve or valves at the termination of a previous cutting operation there has been trapped in the oxygen-supply line to the torch the high oxygen pressure required during that cutting, since upon the opening of that valve or valves necessary for the new use of the system that pressure will be abruptly discharged from the torch. This difficulty cannot satisfactorily be obviated by dispensing with all such valves since the presence of at least one at or closely adjacent the torch, to be closed at the conclusion of a cutting operation, is very desirable to avoid unwanted overcutting (as well as to guard against reverse creepage of unconsumed combustible gases of the preheating flames). The invention provides for the obviation of the difficulty by the venting away of such otherwise entrapped pressures.

In an important aspect, the invention provides for the placement of the preheating flame and the jet discharge under the control of a record, which preferably (as mentioned above) will be a record which controls the torch movement.

Various objects of the invention have been made apparent in the foregoing brief statement. Allied and other objects will appear from the following detailed description and the appended claims.

In the description, reference is had to the accompanying drawings, in which.

Figures 1, 2:
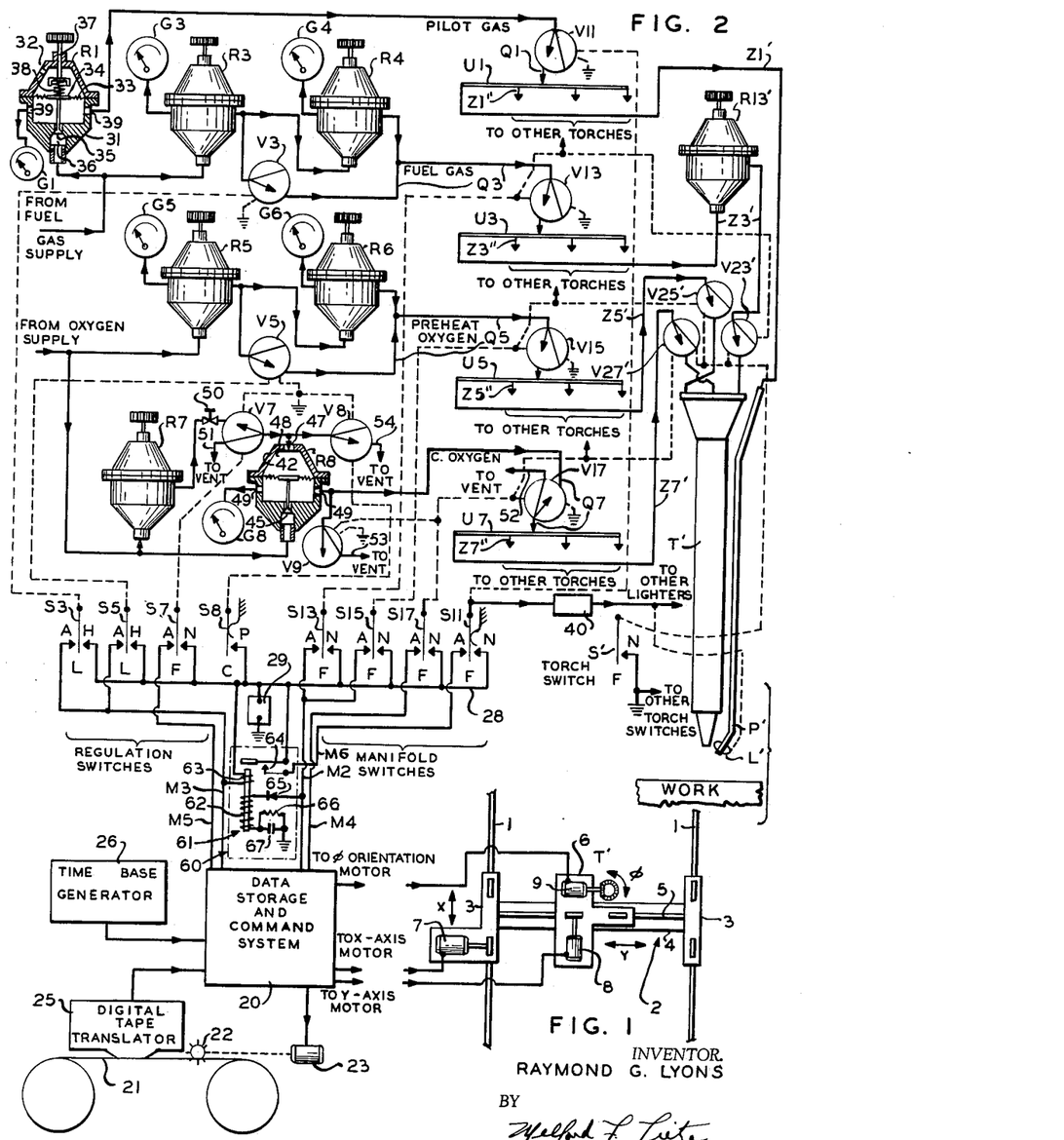
FIG. 1 is simplified plan view of a cutting apparatus with which the invention may be employed.
FIG. 2 is a schematic diagram showing a typical movement-controlling system for the apparatus of FIG. 1; showing for that apparatus a flame- and jet-controlling system embodying the invention, the torch of FIG. 1 appearing in FIG. 2 in elevation; and showing the preferred placement of the flame- and jet-controlling system under the control of the record comprised in the movement-controlling system.

FIG. 1 illustrates in highly simplified form a torch-moving apparatus with which my invention may advantageously be employed. Therein, the elements 1 are a pair of rails, typically lying in a horizontal plane, along which there is movable a carriage 2 having end portions 3 immediately over the respective rails 1 and a cross-member 4 joining those end portions. On the cross-member 4 is at least one rail 5, typically horizontal and at right angles to the rails 1, along which there is movable a second carriage 6. The torch T', generally downwardly directed, is mounted to the carriage 6. A servo motor 7 mounted on one of the end portions 3 of the carriage 2 moves that carriage (and with it, of course, carriage 6 and the torch T') in the direction of the rails 1, which may be termed the X direction; a servo motor 8 mounted on carriage 6 moves that carriage (and with it, of course, the torch T') in the direction of the rail 5, which may be termed the Y direction; and a servo motor 9 also mounted on carriage 6 moves the torch angularly about a vertical axis, thus establishing its orientation in the angular direction. The work on which the torch is to operate (not shown in FIG. 1) will be stationarily positioned beneath the cross-member 4 and the torch, so that under the influence of the motors the torch is moved relatively to the work.

Figure 3:
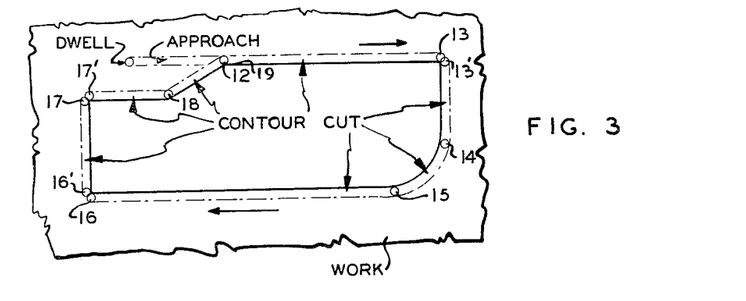
FIG. 3 is a fractional plan view of the work showing a typical contour cut to be made therein and relating it to the action of the system of FIG. 2.

The ultimate function to be performed movementwise is the movement of the jet of oxygen discharged by the torch, accompanied by the flame projected by the torch, along a predetermined contour on the work; this may best be understood with reference to FIG. 3, which shows an arbitrary such contour. The initial jet position may be considered to be that marked "Dwell." The jet is required from that position to make a first movement in a straight line to the position 13; from position 13 a second movement in a straight line to the position 14, shifting angularly from 13 to the overlapping or adjacent position 13' as an initial part of that movement; from position 14 a third movement in an arc to the position 15; from position 15 a fourth movement in a straight line to position 16; from position 16 a fifth movement in a straight line to position 17, shifting angularly from 16 to 16' as an initial part of that movement; from position 17 a sixth movement in a straight line to position 18, shifting angularly from 17 to 17' as an initial part of that movement; and from position 18 a seventh movement in a straight line to position 19—which lies on the path of the first movement, so that the contour will then have been fully traversed and the piece therewithin thus fully separated from the work. (The foregoing for precision has spoken in terms of jet position and movement; they are, of course, determined by torch position and movement, and for convenience the latter rather than the former may hereinafter be referred to from time to time.) The finishing position 19 has been also provided with the numeral 12 to designate that same position as of the time it is passed through in the initial movement from "Dwell" to 13.

Such movements as described in the preceding paragraph may, of course, all be commanded by suitable times, extents and directions of rotation of the motors 7, 8 and 9, achieved by suitable times, extents and polarities (or phases) of current supply to those motors. For such current supply thereto there may be used an electrical command system 20 schematically shown in the lower part of FIG. 2, which in turn is under the control of a record 21 which bears recorded data identifying the contour along which the torch is to move. The record 21 may, for example, be a tape bearing the data in digital form; the tape may be of the known type having therein a succession of combinations of punched holes, each combination representing a respective digit. FIG. 2 schematically shows, connected to the command system 20, a digital tape reader or translator 25 past which the tape record may be moved and which translates the data borne by the tape into digital electrical information for supply to the system 20.

The record preferably bears its torch-movement-identifying data in block arrangement, wherein one block identifies a respective course to be traversed—or, in the terms used in the second preceding paragraph, movement to be made—by the torch. An appropriate manner of operation comprises the translation by the translator 25 of a block of data, its temporary storage, its later release from storage to the command system—and, while that block is being released, the translation and temporary storage of the subsequent block of data followed by its later release, and so on in a sequence in which (after the storage of the very initial block) the storing function stays essentially one block in advance of the releasing function. The storing system is closely intermeshed with the command system—the two constituting a form of computer arranged for digital input and analogue output—and the numeral 20 has been used to designate the joint system.

Each block of data may be translated very rapidly, and the record need be moved past the translator only intermittently for the brief intervals required for such translations. To this end the record has been shown as propelled by the toothed wheel 22 rotated by the motor 23, that motor being under the command of the system 20 which energizes it intermittently as required. Extent of a commanded function being represented in the recorded data only in digital form (and not by spacings on the record), it is necessary that the overall system generate some base to which the system 20 may refer data which it receives as to extent; the provision of such a base is schematically indicated by the time base generator 26. In general, and to avoid extra complexity, the system 20 is conveniently arranged so that a commanded function will take place or being promptly upon the inception of release, from storage, of the block of data commanding it—the significance of the continuation of that release being control over the extent or duration of the function.

A typical torch-moving apparatus with which the invention may be employed has thus been described. While its portions 20 through 26 are themselves of relatively great complexity, they are known in the art and, not in themselves constituting the instant invention, they are not described in detail.

Attention may now be directed to the upper or main part of FIG. 2, wherein the torch T' appears, above and with its extremity directed toward the work, in elevation. External of but associated with the body of the torch T' is shown a pilot-gas tube P' which may be considered as forming a part of the torch. Leading to the torch are four supply lines Z1', Z3', Z5' and Z7' respectively for pilot gas, preheating fuel gas, preheating oxygen and cutting oxygen. The preheating fuel gas and preheating oxygen are sometimes herein collectively referred to simply as preheating gas, it being their combination in suitable proportions which is used to project a preheating gas flame from the torch onto the work. Finely to adjust those proportions the torch is provided with a regulating valve R13' (similar in type, for example, to ones later mentioned for other positions) interposed in the line Z3'. Further, in the lines Z3', Z5' and Z7' the torch T' may be provided with respective solenoid-actuated (or other electrically actuated) valves V23', V25' and V27', which, for example, may be closed when not electrically energized. In the schematic illustration of each of these solenoid valves the full line within the circle simply designates a duct which on energization of the solenoid is reoriented, from the illustrated position wherein it has closed the valve and broken the continuity of the supply line, to the position indicated by the arrow wherein it will open the valve and establish continuity of the supply line; it will be understood, however, that this arrangement is for readily intelligible illustration only and that no structural limitations are thereby intended.

The torch T' will, of course, be provided at its lower extremity with a suitable orifice for the discharge of the jet of cutting oxygen, and with a suitable orifice or orifices for the projection of the preheating gas flame, all in manner well understood in the art and forming no part of the present invention.

The torch supply lines Z1', Z3', Z5' and Z7' emanate from respective supply manifolds U1, U3, U5 and U7, and it is to be understood that from those manifolds other supply lines (such as Z1", Z3", Z5" and Z7" for a second torch) may lead to other torches (not shown), as to each torch through a group of torch-associated valves such as R13'–V23'–V25'–V27'. Such other torches may be associated with the apparatus of FIG. 1, for movements simultaneously with those of torch T' so that cutting along other identical contours may be simultaneously carried out in other areas of the work, in manner well understood in the art and not herein necessary to disclose. For each torch there may be provided a respective torch switch, e.g. S' for torch T', to which the solenoids of its three solenoid valves (e.g. of V23', V25' and V27') are connected, as dottedly illustrated in FIG. 2, for simultaneous connection in circuit (e.g. to ground); movement of any of these switches (e.g. of S') from its off position F to its on position N serves to prepare those three solenoid valves of that torch to be energized in manner hereinafter described, so that they form means for selecting the one or ones of a plurality of torches which will be operated at any given time.

Leading to the manifolds U1, U3, U5 and U7 are respective manifold supply lines Q1, Q3, Q5 and Q7. In these lines are interposed respective solenoid valves V11, V13, V15 and V17, each, for example, closed when not electrically energized; each of these, being a manifold valve, performs a collective function. For these manifold solenoid valves there may be provided respective manifold switches S11, S13, S15 and S17, to the pole of each of which the respective solenoid is electrically connected, as dottedly illustrated in FIG. 2; movement of any of these switch poles from its off position F to its manual-on position N serves to place the respective manifold supply line in operation—that movement connecting the pole through the cooperating contact to a conductor 28 leading to the ungrounded side of a current source 29, for example of D.C.

It may here be pointed out that the valve V27' for the torch T', and the corresponding valves for all other torches, are connected for energization simultaneously with that of the manifold valve V17, as dottedly illustrated for valve V27'—it being understood that the valve V27' (or the corresponding valve for any other torch) will actually experience such energization only if by its respective torch switch it has been prepared for energization as described in the second preceding paragraph. Entirely analogously the valve V23' for the torch T' and the corresponding valves for other torches may be connected for energization simultaneously with that of manifold valve V13, while the valve V25' for torch T' and the corresponding valves for other torches may be connected for energization simultaneously with that of manifold valve V15—subject to entirely analogous remarks as to preparation for energization.

From time to time hereinafter reference may be made to the energization and deenergization, or opening and closing, of the manifold valves V13, V15 and V17; for simplicity of description it may not each time be stated that such action will be accompanied by a corresponding action as to the respectively associated torch valves—but it will be understood that such corresponding action will occur in the case of the respectively associated valve of each torch whose group of valves has been prepared for energization.

The manifold supply line Q1 may be supplied with pilot gas from the fuel gas supply through a manually adjustable regulator valve R1. This regulating valve, to which other regulating valves hereinafter mentioned (as well as R13' above-mentioned) are similar, has been schematically illustrated in cross section as comprising a flanged lower housing 31; a flanged and vented upper housing 32; a diaphragm 33 peripherally clamped between the flanges of the housings and centrally provided with a disc 34; a downwardly opening valve 35 centrally positioned in the lower housing axially of and controlling an inlet port 36 and coupled to the bottom of disc 34; an adjusting screw 37 centrally threaded through the upper housing 32 and serving adjustably to compress a spring 38 which bears down on top of disc 34; and outlet ports 39 from the lower housing. Such a regulating valve will be closed, but at the threshold of opening, when the pressure at the outlet ports 39 acting upwardly on the diaphragm 33 just balances the bias exerted downwardly on the diaphragm by the compressed spring 38; it would be closed with substantial force if the outlet-port pressure were to be greater, and will be open whenever that pressure is less, than the pressure first defined—to which it accordingly regulates the outlet-port pressure. A gauge G1 connected to one of the outlet ports may display the regulated pressure, the manifold supply line Q1 being connected to the other outlet port.

It is to be understood that the structure thus described has been selected for simple and readily intelligible illustration only and that no structural limitations are thereby intended; in practice, there will be employed any suitable manually adjustable regulating valve, such for example, as that disclosed in U.S. Patent No. 2,447,067 issued on application of J. K. Hamilton to the assignee of the present invention.

The purpose of the pilot gas, which while switch S11 is in manual-on position N passes to the pilot-gas tubes of the torches (e.g. to P' of torch T'), is to provide a temporary local flame at the active or lower extremity of each torch. For this purpose it must be lit. A conventional arrangement for lighting it comprises in each torch a lighting electrode, e.g. L' in torch T', spaced slightly away from the discharge extremity of the pilot-gas tube, and means for creating a spark or arc discharge between that electrode and a nearby part, for example, the pilot-gas tube itself, of the torch. Thus, FIG. 2 illustrates as 40 a means, connected with the pole of switch S11 for energization simultaneously with the opening of the manifold solenoid valve V11, for generating a suitable high voltage which by suitable electrical connection, such as dottedly illustrated for the lighting electrode L', is impressed on the lighting electrodes of the several torches. The temporary local flame mentioned above in turn serves the simple function of igniting the preheating gas flame; thus, the several elements for supplying and lighting the pilot gas may be broadly considered as simply igniting means. Because of the temporary nature of their function the switch S11 may, if desired, be arranged for spring return from its manual-on position N, as indicated schematically in FIG. 2, thereby guarding against inadvertent needless prolongation of use of the igniting means.

The manifold supply line Q3 may be supplied with the fuel-gas component of the preheating gas, for example from the same source as that which supplies the pilot gas, through a regulating valve R3, which may be similar to the regulating valve R1 above described and may be provided with a gauge G3 displaying its outlet-port pressure, and a solenoid valve V3—the latter being shown in FIG. 2 in closed condition for purposes hereinafter explained but being openable, in manner hereinafter explained, for normal preheating. Correspondingly, the manifold supply line Q5 may be supplied with the oxygen component of the preheating gas, for example, from the same source as that which will be used for the cutting oxygen, through a regulating valve R5, also similar to R1 and provided with a gauge G5 displaying its outlet-port pressure, and a solenoid valve V5—the latter being shown in closed condition but being openable for normal preheating.

The manifold supply line Q7 may be supplied with a cutting gas such as oxygen through a fluid-pressure-controlled regulator R8, which has been schematically illustrated in cross section in FIG. 2. Its diaphragm and disc and parts therebelow are shown as quite the same as those of the manually adjustable regulating valve R1 and need not be redetailed; its upper housing, designated as 42, is, however, neither vented to the atmosphere nor provided with any manual adjustment spring, but is simply provided with a port 47 through which fluid under pressure may be introduced into the chamber 48 formed by it and the diaphragm. The valve 45 of the regulator R8 will be closed, but at the threshold of opening, when the pressure at the outlet ports 49 acting upwardly on the diaphragm just balances the force exerted downwardly on the diaphragm by the fluid in the chamber above-mentioned; it would be closed with substantial force if the outlet-port pressure were to be greater, and will be open whenever that pressure is less, than the pressure just necessary to balance the diaphragm in the chamber—to which pressure the outlet-port pressure is accordingly regulated.

It will, of course, be understood that again a gauge, in this instance G8, may display the outlet-port pressure. It will further be understood that again the structure shown and described has been selected for simple and readily intelligible illustration only and that no structural limitations are thereby intended; in practice there will be employed any suitable fluid-pressure-controlled regulator having a fluid chamber of appreciable size.

During the normal cutting action of the apparatus, there will be maintained in the chamber 48 a fluid pressure appropriate to the desired normal-cutting jet discharge of oxygen. For this purpose, a convenient (though in no sense necessary) available fluid under pressure is oxygen itself. Accordingly, FIG. 2 illustrates the passage of oxygen from the source or supply thereof already mentioned to the chamber 48 through a regulating valve R7, which may be similar to the regulating valve R1 (though it need not be provided with a gauge), and an associated solenoid valve V7—shown in FIG. 2 in open condition (as far as its basic function is concerned) for purposes hereinafter explained but being openable, in manner hereinafter explained, for normal cutting—which serves to control the regulator R8.

Assuming that the solenoid valves V3, V5 and V7 were already open to the passage of fuel gas and oxygen from the preceding regulating valves R3, R5 and R7 respectively (or had been omitted altogether), a simple manipulation of the manifold switches would be the throwing of S13, S15 and S11 simultaneously each to its manual-on position N—that throwing of the first-mentioned two starting the preheating gas flow for projection from the torch of a normal preheating gas flame, and that throwing of the last-mentioned (which need be maintained for a brief interval only) igniting that flame. After that flame had been continued for an interval appropriate to the normal preheating of the work (for example, at the position marked "Dwell" in FIG. 3) the switch S17 would be thrown to its manual-on position N to initiate the normal-cutting jet discharge of oxygen from the torch, and the torch movement under the control of the record 21 would be started.

I have found, however, that operation of the system in this or an equivalent manner is disadvantageous for various reasons made apparent introductorily above. Accordingly, as there indicated, in accordance with the invention I arrange the preheating-gas supply means to be placeable alternatively in low-flow and high-flow conditions, so that the preheating flame is projected from the torch alternatively at low and high intensity; further, I provide the cutting oxygen supply path with means rendering gradual the onset of the jet discharge of oxygen.

Thus, around the solenoid valve V3 there may be connected a manually adjustable regulating valve R4, similar to the regulating valve R1 above described and provided with a gauge G4 displaying its regulated or outlet-port pressure, which when the valve V3 is closed constitutes the regulated pressure in the manifold supply line Q3. The regulating valve R4 will be adjusted to render that pressure very substantially less than the outlet-port pressure from R3. For the solenoid valve V3, there may be provided a "regulation" switch S3 to the pole of which the solenoid of V3 is electrically connected, as dottedly illustrated in FIG. 2, and of which a cooperating contact is connected to the conductor 28; movement of the S3 switch pole from open to closure against that contact—or from "low" position L to "high" position H—will shift the valve V3 from closed to open condition, and will, therefore, shift the Q3 pressure from relatively low to relatively high.

Quite correspondingly, around the solenoid valve V5 there may be connected a manually adjustable regulating valve R6 provided with a gauge G6 displaying its regulated or outlet-port pressure, which when the valve V5 is closed constitutes the regulated pressure in the manifold supply line Q5 and which by adjustment of R6 will be rendered substantially less than the outlet-port pressure from R5. For the solenoid valve V5, there may be provided a regulation switch S5 to the pole of which the solenoid of V5 is electrically connected and of which a cooperating contact is connected to conductor 28; movement of the S5 switch pole from open to closure against that contact — or from "low" position L to "high" position H — will shift valve V5 from closed to open condition and thus the Q5 pressure from relatively low to relatively high.

It will now be readily appreciated that if the switches S3 and S5 be simultaneously thrown from their L to their H positions the preheating gas flame will be shifted from low to high intensity, and vice versa; further, that by suitably interrelating with those simultaneous throwings of the regulator switches S3 and S5 simultaneous throwings of the manifold switches S13 and S15, a control of the preheating gas flame between off and low and high intensity can readily be effected.

In understanding the arrangement by which the cutting-oxygen supply path is controlled to render gradual the onset of the jet discharge, it is convenient first to note that there is provided a means, operable prior to the start of a cutting operation (e.g. prior to the opening of the manifold valve V17 for cutting), for effecting a reduction of the fluid pressure in the chamber 48 to an at-most small, and preferably substantially zero, value. In the dormant or pre-operative state of the apparatus illustrated in FIG. 2, the regulator-control valve V7 will be closed insofar as fluid passage from the regulator valve R7 is concerned; advantage may be taken of this fact by making it a three-port valve which, while it is keeping closed the path from R7 to the chamber 48, is then holding open a venting path from that chamber to the atmosphere, as indicated at 51 in FIG. 2. For this regulator-control valve V7 there may be provided a regulation switch S7 to the pole of which the solenoid of V7 is electrically connected, as dottedly illustrated in FIG. 2, and of which a cooperating contact is connected to conductor 28. Movement of the S7 switch pole from its open or off position F to a manual-on position N of closure against that contact will shift the valve V7 from its illustrated condition wherein it vents chamber 48 to a condition wherein it connects that chamber with R7, and vice versa.

At the instant when the regulator-control valve V7 is thrown by switch S7 to stop the venting of chamber 48 and to connect that chamber with R7, the essentially zero chamber pressure commands an essentially zero regulated oxygen pressure in the manifold supply line Q7, and that commanded oxygen pressure will rise only so fast as the fluid pressure in the chamber 48 builds up. The desired graduality of rise of the commanded oxygen pressure may, therefore, be achieved by limiting the rate at which fluid may flow from R7 into the chamber 48, and this is readily done either by suitably restricting the path between those elements or, preferably, by a manually adjustable simple throttling valve 50 interposed in that path. Accordingly, if the valve V7 be thrown by switch S7 whenever the manifold valve V17 is thrown by switch S17 to start or stop cutting (i.e., both from and to the respective illustrated conditions) each onset of the cutting jet discharge as commanded by the fluid pressure in the chamber 48 will rendered gradual.

If a simple "open-close" form of solenoid valve be used for V17, the oxygen pressure in the cutting-oxygen torch-supply lines such as Z7′, which at the torches are controlled by valves such as V27′, will be precluded from obeying the command of the fluid pressure in chamber 48 while valve V17 and those torch valves are closed, and a substantial pressure may actually remain (from a prior cutting operation) in one or more of those lines while a zero pressure is being commanded. While this condition will be relieved in a quick transient when valve V17 and those torch valves are reopened, that transient will itself constitute an undesirable abrupt discharge of oxygen from the torch or torches. One way of avoiding it, shown in FIG. 2, is to make the valve V17 a three-port valve which, while it is keeping closed the supply line Q7, is then holding open a venting path from the manifold to the atmosphere as indicated at 52; another way is described hereinafter.

The complete avoidance of the undesirable transient action in the way described in the preceding paragraph also calls for the appropriate venting of the portion of the manifold supply line Q7 intervening between the regulator R8 and the manifold valve V17. This may be done by connecting to that supply-line portion a normally open solenoid valve V9, electrically connected (as dottedly illustrated) with the valve V17 to be closed when V17 is opened and vice versa, which when V17 is (as illustrated) closed will vent that supply-line portion to the atmosphere as indicated at 53.

One more desirable venting may be briefly mentioned—this one simply to facilitate the experimental procedure by which final adjustments of the apparatus for a new task are normally made. In the course of such adjustments the regulator valve R7 may have been set for too high a pressure, and merely to reduce its setting will not serve correspondingly to reduce the pressure in the chamber 48 until the next throw of the solenoid valve V7 to chamber-venting position. To reduce the chamber pressure without awaiting such throw of that solenoid valve, there may be provided a simple solenoid valve V8, normally closely but which when open will vent the chamber 48 to the atmosphere at 54. The solenoid valve V8 may have its solenoid electrically connected to the conductor 28 through an openly biased regulation switch S8; this switch in its normal position, designated as C, will leave the valve V8 closed, opening that valve only when held against its bias in the position designated as P.

While various features of the above-described control of the preheating-flame-projecting and jet-discharge-effecting means have utility in the case of purely manual control of the system—i.e., control by manipulations of the switches S13–S15–S17–S11 and S3–S5–S7 as such—they are particularly useful in the case of automatic control which suitably interrelates the functions of the switches. To provide for such automatic control, each of the seven switches last-mentioned may be provided with an additional contact (as illustrated, at the left) into closure against which its pole may alternatively be thrown; the position of each switch when so thrown is in each instance designated as A.

Throw of the switches just mentioned to their automatic positions A may connect the poles of S3 and S5 to a conductor M3, the pole of S7 to a conductor M5, the poles of S13 and S15 to a conductor M2, the pole of S17 to a conductor M4, and the pole of S11 to a conductor M6; each of these conductors may be energized, by way of example, by the application thereto of a potential similar to that of the ungrounded terminal of source 29. The effects of conductor energization and deenergization when the switches are in automatic position are as follows:

Conductor M2 when energized will open the manifold valves V13 and V15, thus placing the preheating-flame-projecting means in action, and when deenergized will close those valves and place those means out of action. Conductor M3 when energized will open the solenoid valves V3 and V5, thus placing the preheating gas (fuel and oxygen) regulating paths in high-flow condition and thereby arranging the preheating-flame-projecting means for high-intensity action, and when deenergized will close those valves and restore those paths to low-flow condition. Conductor M4 when energized will open the cutting-oxygen manifold valve V17, and close venting valve V9 thus placing the jet-discharge-effecting means in action provided conductor M5 be also energized to build up pressure in the chamber 48 of regulator R8, and when deenergized will close that valve and place those means out of action. Conductor M5 when energized will shift the regulator-control valve V7 from chamber-venting to chamber-filling condition, thus starting a build-up of regulated cutting-oxygen pressure, and when deenergized will shift that valve reversely to vent the chamber and relieve that pressure. Conductor M6 when energized will open the pilot-gas manifold valve V11 and activate the high-voltage-generating means 40, thus establishing local flames at the several torches for ignition of the preheating gas, and when deenergized will close that valve (and deactivate 40) and extinguish those local flames.

The required energizations and deenergizations of conductor M6 may be related to those of conductors M2 and M3, and, therefore, need not be separately commanded. This results from the fact that it is necessary only (1) that energization be applied to M6 when and only when energization of conductor M2 is initiated while conductor M3 is deenergized, and (2) that the energization be removed from M6 when conductor M3 is first thereafter energized. While any suitable means for arranging this action might be incorporated internally of the system 20, I have, for completeness of typical illustration, shown an external means 60 comprising a relay 61 having a pull-in coil 62, a holding coil 63 and normally open contacts 64 which may be pulled into closed condition by the pull-in coil and may be held in, but not pulled into, that condition by the holding coil. The pull-in coil 62 may be connected in a series circuit with a diode 65 and a capacitor 67 which is shunted by a resistor 66, that circuit being connected between conductor M2 and ground. The capacitor 67 will have been discharged through resistor 66 in the absence of energization of M2, but upon energization of M2 there will be a temporary flow of charging current into the capacitor through the diode 65 and pull-in coil 62, which will momentarily pull the contacts 64 into closed condition. The holding coil 63 may be connected—for example, between conductor M3 and the ungrounded terminal of source 29—to be energized only when M3 is deenergized; if the above-mentioned momentary closure of contacts 64 occurs while holding coil 63 is energized, the latter will maintain that closure—but only until it is first thereafter deenergized, which will occur when M3 is next energized.

It will now be understood that when the switches S3–S5–S7 and S13–S15–S17–S11 are thrown to their automatic positions A, the energizations and deenergizations of the conductors M2, M3, M4 and M5 become operations through which a complete control over the flame-and-jet system—i.e. the preheating-flame-projecting and jet-discharge-effecting means—may be accomplished. Those energizations and deenergizations may be accomplished in any desired manner. It is, however, advantageous that they be placed under the control of a record, and particularly advantageous that they be placed under the control of the record 21. For this purpose, the conductors are shown as emanating from the data storage and command system 20, which will accordingly be called on to command, or effect, those energizations and deenergizations in appropriate sequence and timing. To fix such sequence and timing the system 20 must receive appropriate data from the record 21.

In order to furnish such data to the system 20 the record may bear, in each block of its recorded digital data which directs a movement function at whose inception there should occur or begin some shift of condition of the flame-and-jet system, additional or auxiliary data directing that shift—and for each shift of condition of the flame-and-jet system which should occur or begin at any other time the record may bear a discrete block of purely auxiliary digital data directing that shift. In each case the auxiliary data will be translated by the translator and fed to the data storage and command system 20. That system will act with respect to the now-augmented series of blocks of data, some of which are now themselves augmented, just as above described with respect simply to the blocks of movement-controlling data, excepting that in its releasing action it will release the auxiliary and other data separately—that other data in manner previously described, and the auxiliary data to the conductors M2 through M5 in the form of energizations and de-energizations thereof.

The automatic operation of the overall system may be described in connection with the making of the typical contour cut of FIG. 3, and with the aid of FIG. 4 which comprises a series of curves respectively illustrating various conditions within the flame-and-jet system. At the outset the various components of that system may be assumed to be in the conditions illustrated in FIG. 2, the torch T' to be in a position over the work appropriate to a jet discharge therefrom striking the work at the position marked "Dwell" in FIG. 3, and the record 21—bearing the data appropriate to the cut of FIG. 3—to be in a stationary condition; then by throw of an appropriate switch (not shown) the automatic operation may be started.

Figure 4:
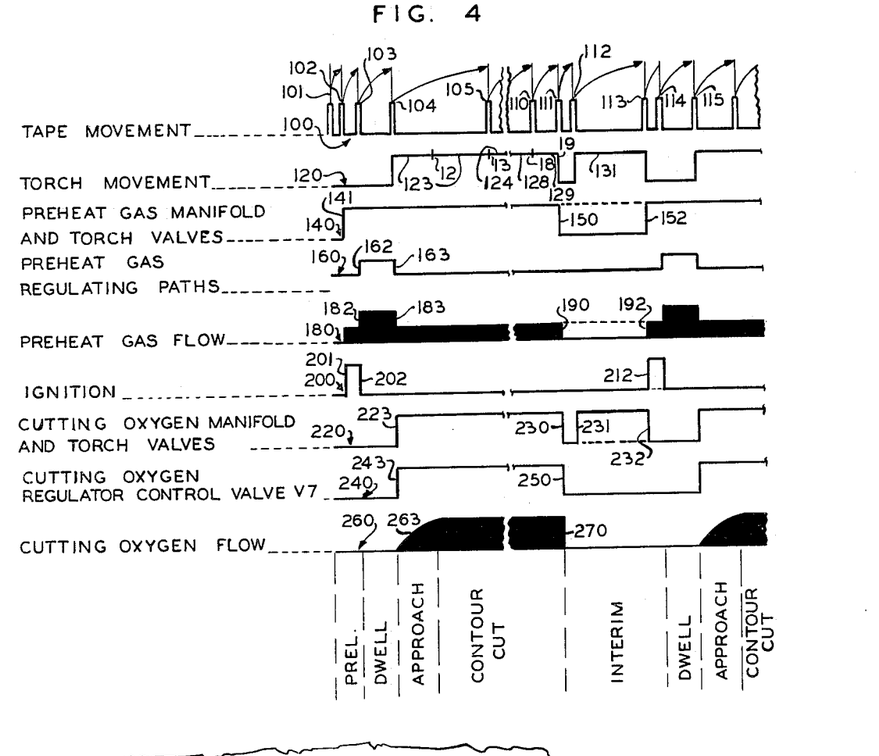
FIG. 4 is a set of curves illustrating typical interrelationships to each other of various functions taking place in the operation of the system.

The tape record 21 will first be driven by motor 23 to present to the transistor 25 the first block of data; this movement of the record is indicated by the short elevated portion 101 of the "Tape Movement" curve 100 in FIG. 4. This first block of data will be received and stored by the system 20, which may forthwith direct a further movement 102 of the record by motor 23 to present the second block of data for translation and storage. The first block of data will have directed the energization of the conductor M2, and at about the time the second block of data is being presented and stored there will be actuated the release of that first-block data to the conductor M2 in the form of energization of that conductor. That release will cause the opening of the manifold valves V13 and V15 (indicated at 141 on the "Preheat Gas Manifold and Torch Valves" curve 140) to result in a low flow of preheating fuel and oxygen (indicated at 181 on the "Preheat Gas Flow" curve 180) and will also, in view of the unenergized condition of conductor M3 and by reason of the action of the relay 61 or its equivalent, cause the energization of conductor M6 to result in an activation of the igniting means (indicated at 201 on the "Ignition" curve 200) and thus ignition of the preheating flame at low intensity.

The first block of data will have directed not merely the energization of conductor M2 but also the time interval which is to intervene before release of the record block is actuated; that time interval will have been established (in the programming represented by the record) as a brief one, sufficient simply for reliable ignition and a transient "warm-up" at low preheating flame intensity. At the expiration of that time interval there will be actuated the release of the second block of data (already translated and stored) and there will be directed a further movement 103 of the record to present for storage a third block of data. The second block of data will have directed an energization of the conductors M2 and M3; M2 being already energized, the actual energization invoked by the release of the second-block data will be simply that of M3. This energization will cause the opening of the solenoid valves V3 and V5 to place the preheating gas regulating paths in high-flow condition (indicated at 162 on the "Preheat Gas Regulating Paths" curve 160), resulting in a high flow of preheating fuel and oxygen (indicated at 182 on the curve 180) and thus in a high-intensity flame, and will also, by reason of relay 61 or its equivalent, cause de-energization of conductor M6 to result in de-activation of the igniting means (indicated at 202 on curve 200).

The second block of data will have directed the time interval which is to intervene before release of the third block is actuated; that time interval will have been established in the programming as an interval sufficient for proper normal (i.e., pre-cut) preheating at the off-contour "Dwell" position of FIG. 3. Both the second and the first blocks of data will be recognized as blocks containing auxiliary data only.

At the expiration of the time interval directed by the second block of data there will be actuated the release of the third block (already presented and stored) and there will be directed a further movement 104 of the record to present for storage a fourth block of data. The third block will have contained movement-controlling data which direct the movement (indicated at 123 in the curve 120) of the torch to position 13 of FIG. 3 and whose release will extend throughout that movement; it will also have contained auxiliary data directing the de-energization of conductor M3 and the energizations of conductors M4 and M5, all of which will occur forthwith when the third-block-data release is actuated. The de-energization of M3 will cause the closing of the solenoid valves V3 and V5 to place the preheating gas regulating paths in low-flow condition (indicated at 163 on the curve 160), resulting in a low flow of preheating fuel and oxygen (indicated at 183 on the curve 180) and thus in a low-intensity flame. The energization of conductor M5 will cause the throw of the regulator-control valve V7 from chamber-venting to chamber-filling position (indicated at 243 on the "Cutting Oxygen Regulator-Control Valve" curve 240) to result in a gradual build-up of regulated oxygen pressure in the manifold supply line Q7, while the energization of the coductor M4 will cause the opening (indicated at 223 on the "Cutting Oxygen Manifold and Torch Valves" curve 220) of the manifold valve in that supply line—the joint result being the gradual onset (indicated at 263 in the "Cutting Oxygen Flow" curve 260) of the flow, and thus of the jet discharge from the torch or torches, of the cutting oxygen.

The movement-controlling data of the third block will have specified the destination (13) to which the directed movement is to take place, but neither it nor the auxiliary data of that block will have indicated time interval as such. That auxiliary data will have left the conductors M2 through M5 in states of energization set forth above, and those conductors will remain in those states until new auxiliary data directs their alteration.

In the early part of the torch movement directed by the third block of data the torch will travel along the path segment designated in FIG. 3 as "Approach." It is during this travel that the flow, and thus the intensity of the jet discharge, of cutting oxygen will undergo build-up to normal-cutting magnitudes. The length of this path segment may be chosen so that the build-up will have been just reliably completed when the torch reaches the position 12, at which it begins to traverse the path of the ultimately desired contour cut itself.

When the torch has reached the position 13, as directed by the third block of data, there will be actuated the release of the fourth block (already presented and stored) and there will be directed a further movement 105 of the record to present for storage a fifth block; the fourth block will have contained movement-controlling data directing movement (fragmentarily indicated as 124 in curve 120) of the torch to position 14 of FIG. 3. When the torch has reached the latter position, there will be actuated the release of the fifth block of data (already presented and stored)—and so on, so that there results a sequence of torch movements which, since the blocks of data directing them normally include no auxiliary data affecting the flame-and-jet system, need not be detailed.

A late one of these further movements (fragmentarily indicated as 128 in curved 120) will take the torch to position 18 of FIG. 3, and at about the beginning of that movement there will have been stored a block of data which may be assumed to be the ninth. When the torch has reached that position 18 there will be actuated the release of that ninth block of data and there will be directed a further movement 110 of the record to present for storage a tenth block. The ninth block of data will have directed movement (indicated as 129 in curve 120) of the torch to position 19 of FIG. 3.

When the torch has reached position 19, there will be actuated the release of the tenth block of data (already presented and stored) and there may be directed a movement 111 of the record to present for storage an eleventh block. At this point, the torch will have completed the contour cut of FIG. 3, and it is usually important that the jet discharge of cutting oxygen be forthwith terminated; at the same time it may be desirable that the torch remain at least briefly stationary, and it may also be desirable that the preheating flame be extinguished. Assuming the second and third of those functions be desired as well as the first, the tenth block of data will have been barren of movement-controlling data but will have contained auxiliary data directing the deenergization of those conductors—M2, M4 and M5—which during the cutting movements were enregized. Then the actuation of the release of the tenth block will forthwith deenergize those conductors, closing (as indicated at 230 on curve 220) the manifold valve V17—and with it, of course, torch valve V27' and/or the analogous valve or valves of any other operating torches—to result in the abrupt stoppage of cutting oxygen flow (as indicated at 270 on curve 260); closing manifold valves V13 and V15 and associated torch valves (as indicated at 150 on curve 140) to result in the stoppage (as indicated at 190 on curve 180) of preheating gas flow; and causing the throw of the regulator-control valve V7 from chamber-filling to chamber-venting position (indicated at 250 on curve 240).

If there has been programmed in the record the automatic movement of the torch to another area on the work where a further contour cut is to be made and the torch movement has been stopped as indicated above, the tenth block of data will have directed a brief interval at the end of which there will be actuated the release of the eleventh block (already presented and stored) and there will be directed a movement 112 of the record to present for storage a twelfth block. The eleventh block will have contained movement-controlling data directing a movement 131 of the torch to a new position (not shown) over the work analogous, as to the further contour cut, to the "Dwell" position of the FIG. 3 contour cut.

At least if the manifold valve V17 has not embodied the arrangement, above described, wherein when closed to flow from regulator R8 it vents to the atmosphere oxygen pressure trapped in the torch supply lines such as Z7', it is very desirable that those lines be relieved of such pressure between cutting operations. This may be done during the inter-cut movement 131 of the torch by including, in the eleventh block, auxiliary data directing the energization of conductor M4, so that upon the release of the eleventh-block data the manifold valve V17 and the torch valves such as V27' will be forthwith opened (as indicated at 231 on curve 220) to vent those supply lines through the torch or torches. (Because of its purely transient nature, the discharge produced by this venting is not shown as a flow in curve 260.) This action, of course, also vents the pressure from the whole manifold supply line Q7, and if always effected also dispenses with the need for V9.

When the torch has completed its movement 131, there will be actuated the release of the twelfth block of data (already presented and stored), and there will be directed a movement 113 of the record to present for storage a thirteenth block. The twelfth block will be barren of movement-controlling data but will direct the deenergization of the conductor M4 to close the manifold valve V17 (as indicated at 232 on curve 220).

At this point, the torch will have just come to rest in a position, and the flame-and-jet system will be in a condition appropriate to the reenactment of the cycle which began with the release of the first block of data. Accordingly, the twelfth block (over and above directing the deenergization of M4) may be similar to the first block, so that its auxiliary data may, like the first block, direct the energization of conductor M2 to cause the opening of the manifold valves V13 and V15 (indicated at 152 on curve 140) and thus to initiate a low flow of preheating fuel and oxygen (indicated at 192 on the curve 180) and, through relay 61 or its equivalent, to energize conductor M6 and thus to activate the igniting means (as indicated at 212 on curve 200). While FIG. 4 illustrates a few more blocks of data and their effects, their identity with blocks and effects (respectively identified by ordinates or numerals lower by 11) already described dispenses with need for further description thereof.

Various modifications of the foregoing operation are, of course, possible, and two may be mentioned in particular. Thus, under appropriate circumstances the maintenance of a low-intensity preheating flame between 190 and 192 may be considered entirely acceptable (which is in itself a particular advantage of providing for the low-intensity flame except for pre-cut preheating). In such a case, the auxiliary data of the tenth block above-mentioned may omit the direction for deenergization of conductor M2, and that for the twelfth block above-mentioned may, of course, omit the direction for its re-energization; the curve 140 would then extend between 150 and 152 as shown in dotted lines, and the curve 180 would be solid where now dottedly hatched; and in curve 200 the rise 212 (and later fall) would disappear, re-ignition being uninvoked and, of course, unnecessary. This, further, would permit the merging of the thirteenth block with the now-simplified twelfth block.

A third modification, ordinarily available if the manifold valve V17 has embodied the supply-line-venting arrangement (and V9 preferably employed), is the omission from the eleventh block above-mentioned of the auxiliary data directing energization of conductor M4 (so that that block becomes barren of auxiliary data), and, of course, the omission from the auxiliary data of the twelfth block above-mentioned of the direction for deenergization of that conductor; the curve 220 would then extend between 231 and 232 as shown in dotted lines. This, further, would permit the merging of conductors M4 and M5 into a single conductor, since no differentiation between their states of energization would any longer be called for at any time, and in turn would permit some simplifications not only of the switching system but also of the record 21, of the translator 25 and of the data storage and command system 20.

Not only may there be made these and other modifications of the operation above described, but also various modifications of the apparatus as hereinabove disclosed which will be suggested by the disclosure to those skilled in the art. For example, in a cutting system employing a stream of gas such as in the so-called plasma cutting process in which a nitrogen or other gas stream is employed as a cutting instrumentality, the feature herein described concerning the gradual increase in flow of the cutting gas at the commencement of the cut may have effective application. In plasma cutting, for example, where an arc is established in a relatively easily ionizable gas, such an argon, and wherein following such establishment of the arc, a flow of nitrogen is subsequently delivered for carrying out the cutting operation, it has been found under certain circumstances desirable to initiate the nitrogen flow at some relatively low rate and to gradually increase such flow in order to avoid blowing out the initiating arc in the easily ionized atmosphere. Such modifications will not necessarily constitute departures from the spirit of the invention or from its scope, which I undertake to define in the following claims.

I claim:

1. In a system for the oxygen cutting of work along a pre-determined contour the combination, with a torch and means for effecting a jet discharge of oxygen therefrom, of means for projecting a preheating gas flame from the torch including gas supply means placeable alternatively in low- and high-flow conditions and means for igniting the projected gas, a movable control record, means actuated by the record for placing the gas-supply means in low-flow condition and operating the gas-igniting means and thereafter shifting the gas-supply means to high-flow condition, and means subsequently activated by the record for placing the jet-discharge-effecting means in action and shifting the gas-supply means to low-flow condition.

2. In a system for the oxygen cutting of work the combination with a torch of a movable control record and translating means therefor and means for intermittently moving the record relative to the translating means to effect translation of successive blocks of recorded data borne by the recording means controlled by the record and actuated by blocks of recorder data thereby borne for effecting a movement of the torch to and along a predetermined contour on the work controllable means for effecting a jet discharge of oxygen from the torch, controllable means for projecting a preheating gas flame from the torch, and means controlled by said record and successively actuated by blocks of recorded data thereby borne for performing on said jet-discharge-effecting and flame-projecting means a plurality of successive control functions.

3. In a system for the oxygen cutting of work along a predetermined contour the combination, with a torch and means for effecting a jet discharge of oxygen therefrom, of means arranged for alternative low- and high-intensity action for projecting a preheating gas flame from the torch, a control record and translating means therefor and means for intermittently moving the record relative to the translating means to effect translations of successive blocks of recorded data, means connected with the translating means and actuated by a block of recorded data for placing the flame-projecting means in high-intensity action, and means connected with the translating means and actuated by a subsequent block of recorded data for placing the jet-discharge-effecting means in action and shifting the flame-projecting means to low-intensity action.

4. In a system for the oxygen cutting of work along a predetermined contour the combination, with a torch and means for effecting a jet discharge of oxygen therefrom, of means for projecting a preheating gas flame from the torch including gas supply means placeable alternatively in low- and high-flow conditions and means for igniting the projected gas, a control record and translating means therefor and means for intermittently moving the record relative to the translating means to effect translations of successive blocks of recorded data, means connected with the translating means and actuated by a block of recorded data for placing the gas-supply means in low-flow condition and actuating the gas-igniting means and thereafter shifting the gas-supply means to high-flow condition, and means connected with the translating means and actuated by a subsequent block of recorded data for placing the jet-discharge-effecting means in action and shifting the gas-supply means to low-flow condition.

5. In a system for the oxygen cutting of work including a torch, means for projecting a preheating gas flame from the torch onto the work, and means for effecting a jet discharge of cutting oxygen onto the preheated work: the combination of gas-supply means included in said flame-projecting means and operable at high flow for preheating, means connected with said gas-supply means and operable to cut the same back to low flow for cutting, means operable initially to ignite the gas flow, and means connected both with the igniting means and with the cut-back means for operating the cut-back means during the operation of said igniting means.

6. In a system for the oxygen cutting of work along a predetermined contour combination, with a torch and means for effecting a movement of the torch along the work from a position spaced from said contour to that contour, of means for projecting a preheating gas flame from the torch, means for effecting a jet discharge of oxygen from the torch, means for placing said flame-projecting means in action prior to said movement of the torch to said contour, and means connected both with said movement-effecting means and with said jet-discharge-effecting means for bringing said jet-discharge-effecting means into operation during said movement.

7. The subject matter claimed in claim 6 wherein said jet-discharge-effecting means includes means rendering gradual the onset of the jet discharge.

8. The subject matter claimed in claim 6 wherein said flame-projecting means is arranged for alternative low- and high-intensity action and wherein said action thereof referred to in that claim is a high-intensity action, further including means connected with said movement-effective means for shifting said flame-projecting means to low-intensity action during said movement.

9. In a system for the oxygen cutting of work along a predetermined contour thereon the combination, with a torch and a movable control record and means controlled by the record for effecting a movement of the torch along the work from a position spaced from said contour to that contour, of means for projecting a preheating gas flame from the torch, means for effecting a jet discharge of oxygen from the torch, means actuated by the record for placing said flame-projecting means in action prior to said movement of the torch to said contour, and means actuated by the record and connected with said jet-discharge-effecting means for bringing said jet-discharge-effecting means into operation during said movement.

10. The subject matter claimed in claim 9 wherein said jet-discharge-effecting means includes means rendering gradual the onset of the jet discharge.

11. The subject matter claimed in claim 9 wherein said flame-projecting means is arranged for alternative low- and high-intensity action and wherein said action thereof referred to in that claim is a high-intensity action, further including means actuated by the record during said movement for shifting said flame-projecting means to low-intensity action.

12. In a cutting system employing a stream of gas as a cutting instrumentality, the combination of
    a torch for forming said cutting stream of gas,
    a shutoff valve for interrupting the flow of the cutting gas to said torch,
    a regulator including a control chamber by which the pressure of the cutting gas supplied to the torch when said valve is open is regulated,
    said regulator, valve, and torch being connected in a series relationship by a means for conveying the gas,
    said control chamber adapted to contain a fluid under pressure with the regulated cutting gas pressure responsive to said fluid pressure,
    means effective prior to the opening of said valve for determining the fluid pressure in said chamber,
    and meas operatively connected with said valve and rendered effective concomitantly with the opening thereof, for altering the fluid pressure in said chamber at a limited rate, whereby to cause a gradual change of said regulated cutting gas pressure.

13. In a cutting system employing a stream of oxygen as a cutting instrumentality, the combination of
    a torch for forming said cutting stream of oxygen,
    a shutoff valve for controlling the oxygen supply to said torch,
    a regulator including a control chamber by which the pressure of the oxygen supplied to the torch when said valve is opened is regulated,
    said torch, valve, and regulator being connected in a series relationship by a means for conveying the oxygen between them,
    said control chamber adapted to contain a fluid under pressure with the regulated oxygen pressure responsive to the fluid pressure,
    means effective prior to the opening of said valve for determining the fluid pressure in said chamber,
    and means operatively connected with said valve and rendered effective concomitantly with the opening thereof, for altering the fluid pressure in said chamber at a limited rate, whereby to cause a gradual change in said regulated oxygen pressure.

14. In a cutting system employing a stream of oxygen as a cutting instrumentality, the combination of a torch for forming said cutting stream of oxygen,
a shutoff valve for controlling the supply of oxygen to said torch,
a regulator including a control chamber by which the pressure of the oxygen supplied to the torch when said valve is opened is regulated,
said torch, regulator, and valve being connected in a series relationship by a means for conveying the oxygen between them,
said regulator being such that it may be actuated to vary the pressure of the oxygen,
means effective prior to the opening of said valve for effecting the regulator to cause the oxygen pressure to be at substantially atmospheric pressure,
actuating means operatively connected with said valve and effective concomitantly with the opening thereof, for actuating the regulator to cause the oxygen pressure to take on a normal cutting value,
and means including a chamber in said regulator for rendering gradual the response of said regulator to said actuating means.

References Cited by the Examiner

UNITED STATES PATENTS

| | | | |
|---|---|---|---|
| 1,189,349 | 7/1916 | Cross | 137—488 |
| 2,167,399 | 7/1939 | Wagner | 148—9 X |
| 2,480,281 | 8/1949 | Bergerow. | |

FOREIGN PATENTS 85,471  6/1920  Switzerland.

OTHER REFERENCES

Computer Cuts Steps in Flame Profiling: in the Iron Age; pages 90–91, May 1, 1958.

WHITMORE A. WILTZ, *Primary Examiner.*

JAMES H. TAYMAN, JR., MORRIS O. WOLK,
*Examiners.*